Oct. 2, 1945. M. WATTER 2,386,019
TRUSS STRUCTURE AND PARTS THEREOF
Filed Jan. 28, 1943 4 Sheets-Sheet 1

INVENTOR
Michael Watter

BY John P. Fairbox
ATTORNEY

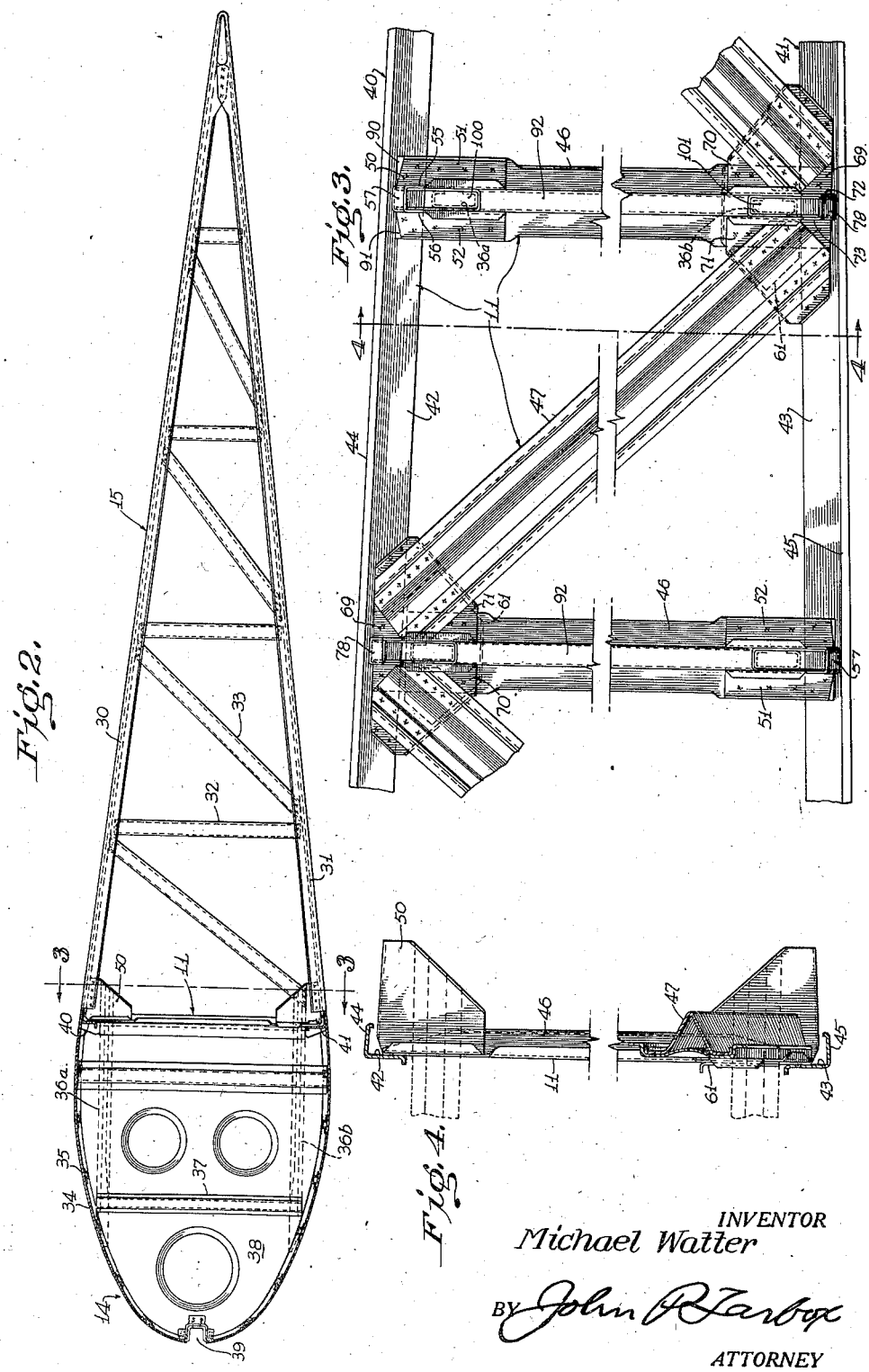

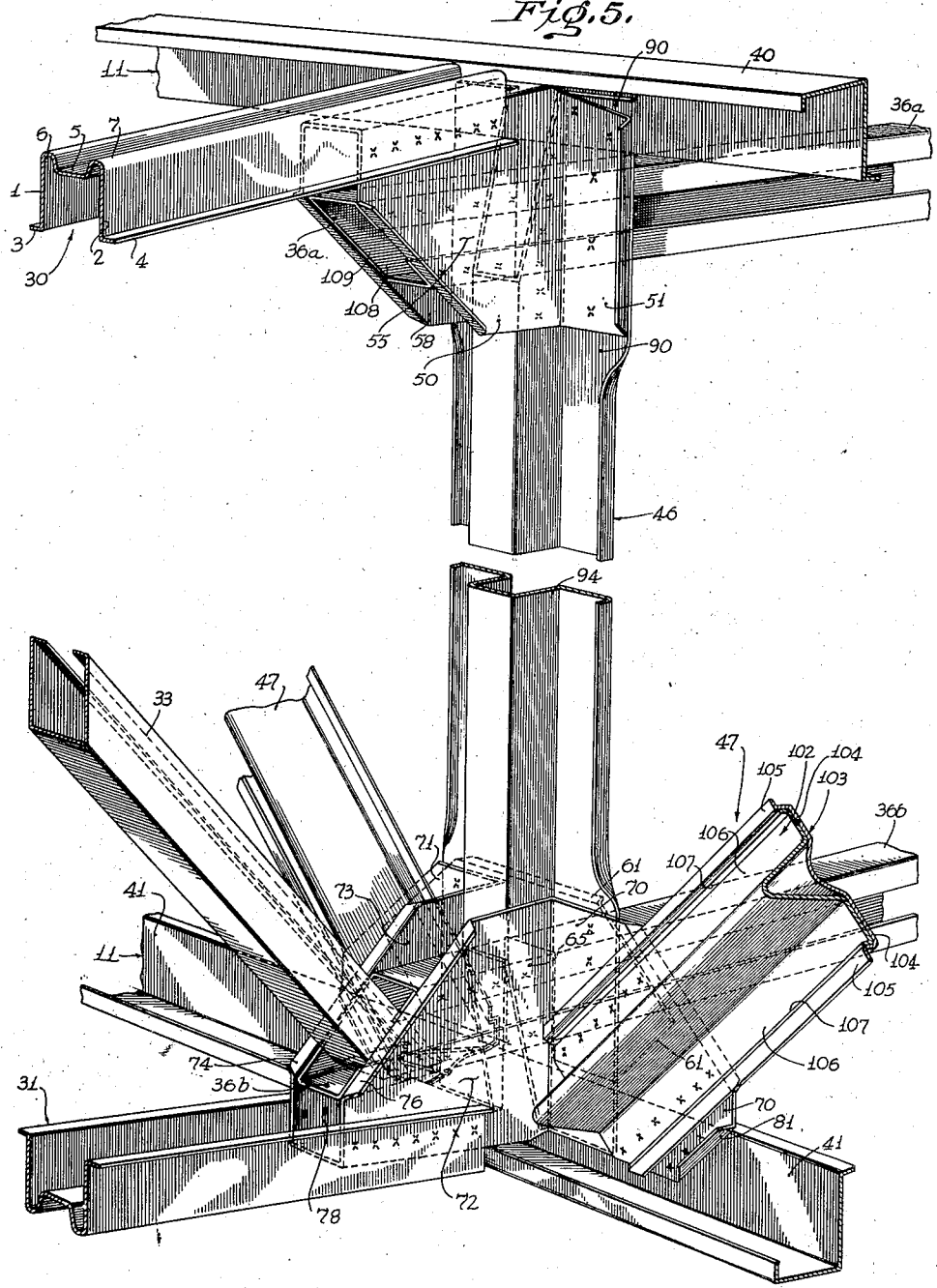

Oct. 2, 1945.　　　　M. WATTER　　　　2,386,019
TRUSS STRUCTURE AND PARTS THEREOF
Filed Jan. 28, 1943　　　4 Sheets-Sheet 4
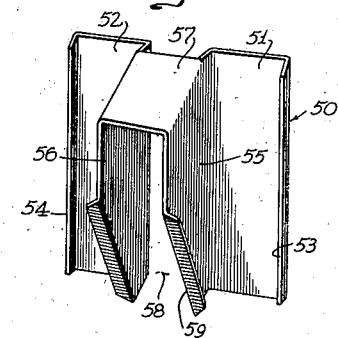
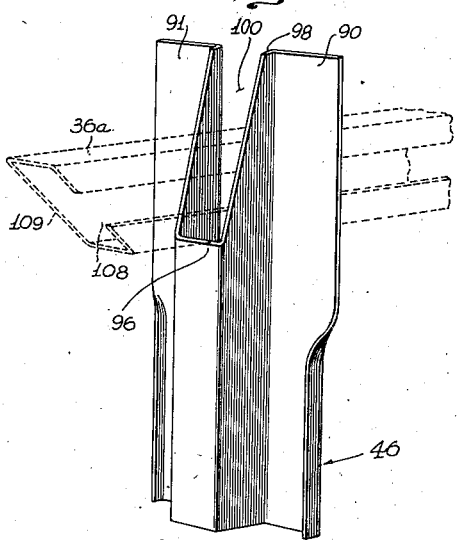
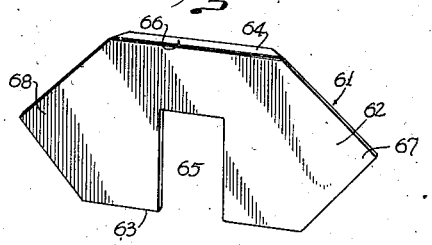
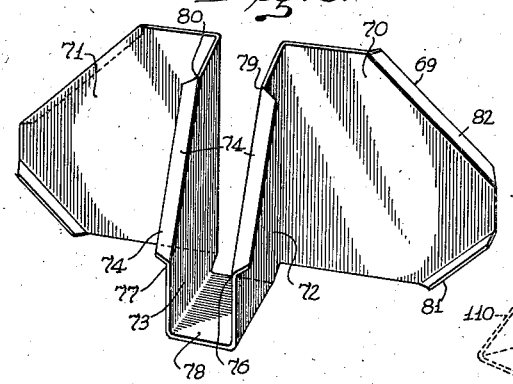
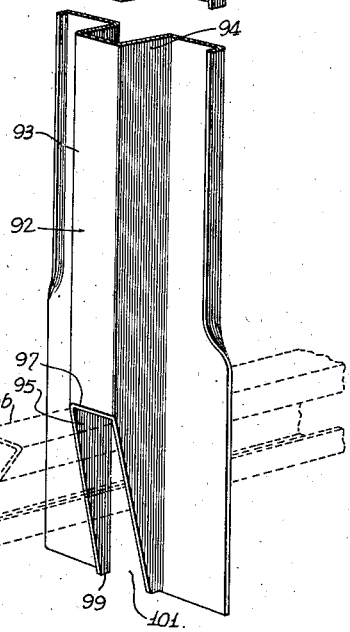
INVENTOR
Michael Watter
BY John P. Fairbox
ATTORNEY Patented Oct. 2, 1945

2,386,019

UNITED STATES PATENT OFFICE 2,386,019

TRUSS STRUCTURE AND PARTS THEREOF

Michael Watter, Philadelphia, Pa., assignor to Edward G. Budd Manufacturing Company, Philadelphia, Pa., a corporation of Pennsylvania Application January 28, 1943, Serial No. 473,808

16 Claims. (Cl. 189—36)

This invention relates to trussed frame structures for airfoils and the like with particular adaptation to airplane rudder construction in which light gauge sheet steel parts are assembled by spot welding.

Among the objects contemplated by this invention is the provision of a joint of improved construction for securing rigidly together structural elements lying in diverse intersecting planes. Another object is to simplify the assembly of angularly disposed structural elements by the use of unitary, many-angled gussets. Still another object is the provision of a new type gusset for facilitating a spot welding sequence of strut attachment in a common joint. An object also is the provision of a gusset construction adapted for con-joining transverse, vertical and diagonal truss elements. Another object is the provision of a joint for sheet metal strut ends in which "breathing" is prevented. An object also is the provision of a four-plate gusset for sheet metal attachment.

Additional objects of the invention include provision of the following items: a spar, the strut ends of which are united by a single gusset; a strut, having divided end formations adapted for reception of cross frame elements; a spar, having a plane front face facilitating connection of the nose chords to the spar; a spar construction permitting extension of nose-chords through the same to the point of gusset attachment; a structure permitting a simplified sequence of assembly by spot welding; a structure in which spot welding may be applied with ease to the component parts and subassemblies; a structure characterized by strength combined with economy of materials.

The above objects are attained in the structure hereinafter described and illustrated in the accompanying drawings in which Fig. 1 is a plan view of an airplane rudder, detached and lying on the side, to which my invention is applied;

Fig. 2 is a sectional view along lines 2—2 of Fig. 1 showing the rib structure;

Fig. 3 is a section taken on lines 3—3 of Fig. 2 showing a representative portion of the length of the spar;

Fig. 4 is a transverse section through the spar truss taken along lines 4—4 of Fig. 3;

Fig. 5 is a perspective of a spar strut showing the upper and lower joint connections;

Fig. 6 is a perspective view of a spar strut;

Fig. 7 is a perspective view of the gusset shown at the top of Fig. 5;

Fig. 8 is a perspective view of the plate gusset shown at the rear of the lower joint in Fig. 5; and Fig. 9 is a perspective view of the gusset shown at the bottom of Fig. 5.

Figure 1:
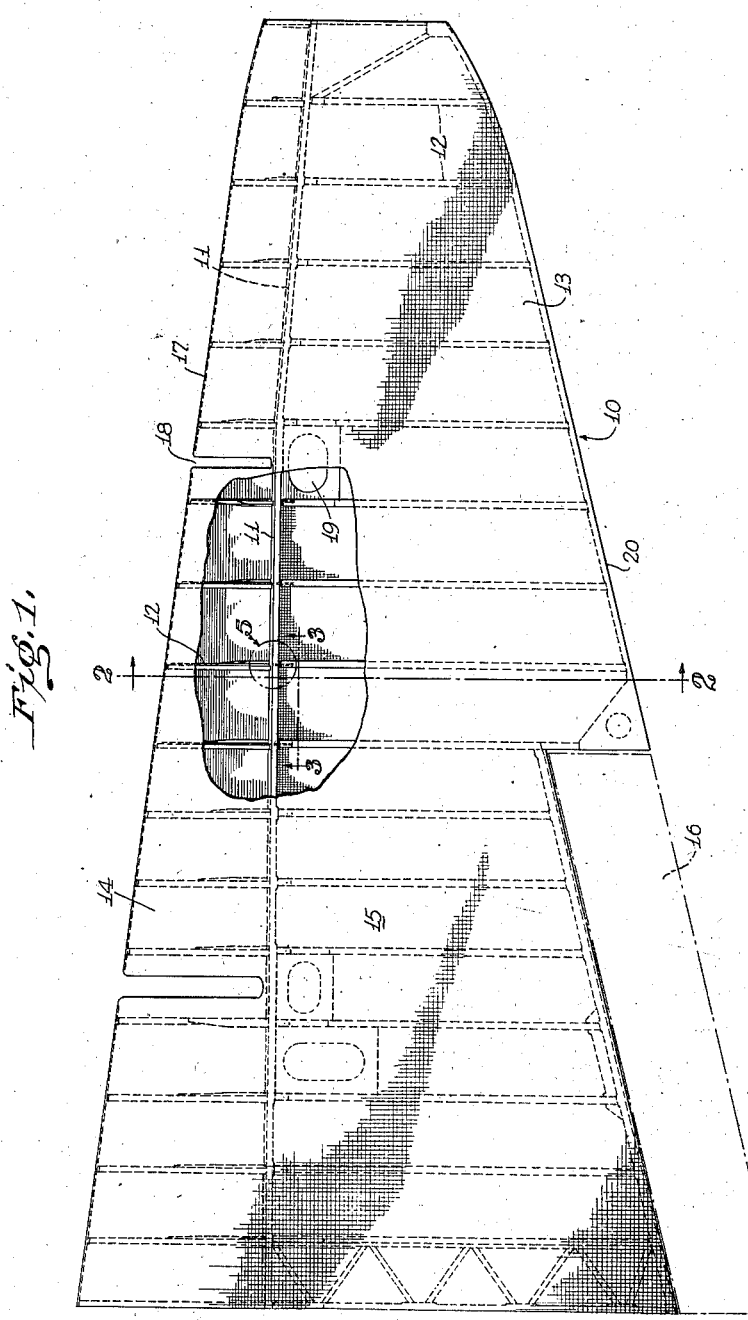

The invention, while not necessarily so limited, has pronounced utility in aircraft construction and hence is shown as applied to the rudder 10, Fig. 1, of a vertical airplane stabilizer unit. As shown, the rudder includes the main spar 11, ribs 12, skin 13, nose or leading portion 14, and trailing body portion 15. The location of a trim tab 16 is indicated in dotted lines, also the leading edge 17 is shown slotted at 18 for pivotal connection to the fin, access to the hinge being through the opening 19. 20 indicates the trailing edge of the rudder.

The rib construction of the rudder is shown in Fig. 2 and is comprised in the triangularly shaped trailing body portion 15, with top chord 30 and bottom chord 31, formed of a single V-strip separated by vertical struts 32, diagonal struts 33, and spar 11; and the nose 14 with nose skin 34, skin stringers 35, rib chords 36a and 36b, rib struts 37 and nose rib web 38. A recess 39 at the center nose point is provided for weight balance attachment.

The spar 11 is detailed in Figs. 3 and 4. Top chords 40 and bottom chords 41 are of similar construction, each consisting of an elongated sheet metal strip bent transversely to length at approximately right angles, to form coplanar plate sections 42 and 43 and transverse plate sections 44 and 45. The spar truss web includes the vertical struts 46 and diagonal struts 47 which are connected at the ends to the chord plate sections 42 and 43 by means of novel gusset constructions.

These gussets, which are shown in perspective in Figs. 7-9, include a first type joint gusset 50 and the two second type joint gussets 61 and 69. Gusset 50, Fig. 7, has two coplanar outer plates 51 and 52, having short outwardly bent edge flanges 53 and 54, and angularly extending parallel inner plates 55 and 56, the end edges of one end of the plates 55, 56 being joined by a connecting web 57. The edges of the inner plates 55, 56 opposite the web 57, slant diagonally toward the outer plates 51, 52 from points about the middle of the inner plate edge length. The diagonal edges 59 are turned outward, as shown. The inner plates 55 and 56 with the connecting web 57 enclose a channel-shaped space 58 to receive the nose chord, as will be described hereafter.

The gusset 61, Fig. 8, which is employed somewhat as a doubler for the gusset 69, is a flat plate 62 slightly elongated, with parallel side edges 63 and 64, the edge 63 having a deep rectangular notch 65 to embrace the nose chord 36a, and the edge 64 being outturned to form flange 66. The plate ends are tapered to form pointed ends 67 and 68.

The gusset 69, Figs. 5 and 9, is broadly similar to gusset 50 in having coplanar outer plates 70 and 71, angularly bent inner parallel plates 72 and 73, and a connecting web 78. The inner plates 72, 73 are provided with diagonal outturned edges 74 extending from outer edge points 76 and 77, spaced from end web 78, to points 79 and 80, spaced from the outer plates 70 and 71. This gusset differs from gusset 50 in having wider outer plates 70 and 71 with both outer corners of each plate cut away and flanged, the shorter plate end flange 81 being turned to the inner plate side and the longer flange 82 in the reverse direction.

The vertical strut 46, Figs. 5 and 6, connecting chords 40 and 41 through the described gussets 50, 61, 69, is of special construction in that the ends thereof are provided with recesses or through openings. As appears from Fig. 6, the strut is formed of coplanar strips or plates 90 and 91 joined by a channeled section 92 having base and side plates 93, 94 and 95. The channel, to form the apertured ends, is beveled from inward points 96 and 97 on the chanel web plate 93 to end points 98 and 99 on the channel side plates 94, 95, thus providing transverse openings 100 and 101 for the nose chords 36a and 36b. The side strips or plates 90 and 91, except adjacent the ends, are flanged at the edges.

The diagonal struts 47 of the spar 11, as shown in Figs. 4 and 5, each consists of two channel strips 102 and 103, strip 102 being deeply channeled in V-shape and cap strip 103 being shallowly channeled with flat wing edge plates 104 and up and outwardly turned edge flanges 105. The strip 102 is similarly formed with edge plates 106 and upwardly turned edge flanges 107 which nest in the side channels formed by the edge plates and flanges of strip 103. Attachment of these nested strips is made by spot welds in the overlying edge plate areas.

In Fig. 5 the structure of trailing rib chords 30 and 31 is illustrated, the same being channel-shaped with parallel side strips or plates 1 and 2, edge flanges 3 and 4 on the side plates, and an inwardly or reversely channeled base plate 5 bordered by grooves 6 and 7. This figure also shows the box section of trailing rib diagonal strut 33, with its edge opening.

Figs. 5 and 6 illustrate the structure of the nose chords 36a and 36b. These chords are of sheet metal bent along the axis into a rectangular box shape, adjacent edges forming a pronounced gap 108 on one side. The joining ends of chords 36a and 36b are formed at angles, as shown, to fit the associated gusset structure.

The various structural elements having been described, the method of assembly will now be considered, having in mind the special adaptation of the structural elements to spot welding. The nose portion 14, trailing portion 15, and spar 11 are subassembles which may be separately constructed. In assembling the trailing portion, the rib elements 30, 31, 32, 33 are placed in a jig and spot welding applied to the strut-chord lap joints and to the trailing edge overlap junction of the chords. Before or after the trailing ribs are connected to the nose-spar assembly, they are connected together at their trailing ends by suitable border elements. The nose portion is assembled by bringing together in appropriate jigs the web, chords, and struts 38, 37, 36a, 36b and spotwelding these elements. The skin blanket 34, 35 is then applied to the ribs to form a connected nose assembly.

The spar subassembly, which involves the novel gusset joints of this invention, is formed by spotwelding the strut edge plates 90 and 91 to the coplanar strips or plates 42 and 43 of the spar chords 40, 41. The gussets 50 and 69 are then welded to the ends of the edge plates 90, 91 of the strut 46, the gusset 50 to one end and gusset 69 to the other end. In applying gusset 50, the gusset wing plates 51 and 52 overlie and are welded to the strut edge plates 90 and 91 and the spar chord strip 42. Gusset 69 is spotwelded through its wing plates 70 and 71 to the strut edge plates 90 and 91 and to the spar chord strip 43 thus insuring adequate resistance to torsional forces. Diagonal struts 47 are then applied at the proper angle to the front faces of the gusset plates 70 and 71 at each end and spotwelded thereto and to the spar chord strips 42, 43.

The nose subassembly is now applied to the strut, the chords 36a entering through strut space 100 and gusset space 58, as shown in the upper portion of Fig. 5, and chord 36b entering strut space 101 and gusset space between plates 72 and 73, as shown in the lower portion of Fig. 5. The diagonal ends 109 and 110 of the nose chords 36a, 36b are flush with the diagonal edges 60 and 74 of the upper and lower gussets, and each chord is juxtaposed to the inner edge flange of the adjacent spar chord. Spot welds are applied through the gussets to the nose chords. The gusset 61 is then inserted in front of the spar strut, straddling the nose chord 36b, and welded to the strut and to the rear gusset 69. As shown in Fig. 2, the skin 34 is lapped over the outer plates 44, 45 of the spar chords and welded thereon.

The trailing ribs may now be applied to the nose-spar assembly. In accomplishing this assembly, the rib chords 30 and 31 and the foremost rib diagonal strut 33 are engaged with the respective spar gussets, the chord 30 overlying the web 57 of gusset 50, the chord 31 overlying the web 78 of gusset 69, and the foremost diagonal 33 entering the open end of nose chord 36b. Spot welds are then applied to join the rib chord and diagonal strut side walls to the gusset plates 55, 56, 72, and 73. It is noted that the trailing rib chord ends abut the flanged side edges of the outer plates 44, 45 of the spar chords and the rib diagonal end 33 engages the base wall of the nose chord 36b.

In the construction as described attention is particularly directed to the unitary form of plate gusset construction which provides easy and accurate assembly and strong and rigid connections. With this gusset, spacing of numerous parts is established and the jigging, setting and welding are all simplified. Also the joint assembly combining gussets 61 and 69 to prevent "breathing" is believed important. The spar construction combining the vertical and diagonal struts of the truss with the specific form of gusset joint assures a rigid and yet light arrangement. Also, the through placement of nose chords in the spar joints makes a most satisfactory and strong joint connection.

Emphasis is made on the applicability of the described structure to spot welding operations. The truss and gusset connections involve open and flat plate areas which are easily accessible. Further, the welding points, combined with the assembled shapes, combine to make a strongly reinforced and rigid construction.

In the claims the term "vertical" is employed to describe a strut extending substantially at right angles to a chord. Also the term "strut" is used to designate all chord connecting members in rib and spar trusses.

While described in connection with airplane rudder structure it is apparent that the invention may be applied to other trussed frame assemblies. Also the specific form and arrangement may be subject to modification the invention being circumscribed only as defined in the appended claims.

What is claimed is:

1. A spar comprising marginal chord members, intervening vertical struts with slotted ends joining said chord members, and gussets having coplanar spaced wing plates for attachment to said strut ends and an interiorly open channel bridging said wing plates, the channel openings being in registry with the openings in the slotted strut ends, and second gussets secured to the strut ends on the side opposite the first gussets, said second gussets having flat sections extending beyond the strut edge whereby attachment thereof may be made both to said strut and said first gusset.

2. In a structural assembly, as for hollow covered aircraft bodies, in combination, a first truss member and two aligned transverse truss members connected in a joint at said first truss member, one of said transverse truss members having the stub ends of spaced longitudinal chord elements extending through spaced openings in a strut of the first truss member, the other of said transverse truss members having longitudinal chord elements disposed adjacent and in axially offset relation to the stub ends of the chords of the first said transverse truss member, and means at one side of the first truss member securing together said strut, one of said stub chord ends, and said longitudinal chord element of said other transverse truss member.

3. In a structural assembly, as for hollow covered aircraft bodies, in combination, a first truss member and two aligned transverse truss members connected in a joint at said first truss member, one of said transverse truss members having the stub end of a longitudinal element extending through an interior opening in the first truss member, said first truss member including strut elements on each side of the opening, said second transverse truss member having a longitudinal element disposed adjacent the stub end of the longitudinal element of the first said transverse truss member, and means at one side of the first truss member securing together said strut elements, said stub end, and the longitudinal element of the second transverse truss member, said connecting means including a gusset connected to a strut element and to the longitudinal elements on both of said transverse trusses.

4. In a structural assembly, as for hollow covered aircraft bodies, in combination, a first truss member and two aligned transverse truss members connected in a joint at said first truss member, one of said transverse truss members having the stub end of a longitudinal element extending through an interior opening in the first truss member, said first truss member including strut elements on each side of the opening, said second transverse truss member having a longitudinal element disposed adjacent the stub end of the longitudinal element of the first said transverse truss member, and means at one side of the first truss member securing together said strut elements, said stub end, and the longitudinal element of the second transverse truss member, said strut elements including plates aligned with said longitudinal elements, and said securing means including gusset plates aligned with said longitudinal elements and connected to the strut plates and to the longitudinal elements of both trusses.

5. In a structural assembly, as for hollow covered aircraft bodies, in combination, a first truss member and two aligned transverse truss members connected in a joint at said first truss member, one of said transverse truss members having the stub end of a longitudinal element extending through an interior opening in the first truss member, said first truss member including strut elements on each side of the opening, said second transverse truss member having a longitudinal element disposed adjacent the stub end of the longitudinal element of the first said transverse truss member, and means at one side of the first truss member securing together said strut elements, said stub end, and the longitudinal element of the second transverse truss member, said strut elements including angle elements with one plate aligned with and secured to the longitudinal element of at least one of the transverse truss members, and one plate aligned with and secured to longitudinal elements of the first truss member, and said securing means including angle gusset elements with one plate aligned with and secured to the longitudinal elements of said transverse truss members, and one plate aligned with and secured to the first truss member.

6. In a structural assembly, as for hollow covered aircraft bodies, in combination, a first truss member and a second transverse truss member connected in a joint to the first truss member, said second truss member having the stub end of a longitudinal element extending through an interior opening in the first truss member, said first truss member including strut elements on each side of the opening, and a gusset at one side of the first truss member securing together said strut elements and said stub end, said gusset including spaced coplanar plates at each side of the opening secured to the first truss member and to said strut elements, angle plates secured to said stub end, and a web connecting said angle plates at one edge.

7. In a structural assembly, as for hollow covered aircraft bodies, in combination, a first truss member and a second transverse truss member connected in a joint to the first truss member, said second truss member having the stub end of a longitudinal element extending through an interior opening in the first truss member, said first truss member including strut elements on each side of the opening, and a gusset at one side of the first truss member securing together said strut elements and said stub end, said gusset including spaced coplanar plates at each side of the opening secured to the first truss member and to said strut elements, angle plates secured to said stub end, and a web connecting said angle plates at one edge, said stub end being hollow with plate-like portions secured to the angle gusset plates on each side of said aperture.

8. In a structural assembly, as for hollow covered aircraft bodies, in combination, a first truss member and a second transverse truss member connected in a joint to the first truss member, said second truss member having the stub end of a longitudinal element extending through an interior opening in the first truss member, said first truss member including strut elements on each side of the opening, and a gusset at one side of the first truss member securing together said strut elements and said stub end, said gusset including spaced coplanar plates at each side of the opening secured to the first truss member and to said strut elements, angle plates secured to said stub end, and a web connecting said angle plates at one edge, said stub end being hollow with plate-like portions secured to the angle gusset plates on each side of said aperture, and a strut of a second transverse truss member secured within the end of said hollow stub end.

9. In a structural assembly, as for hollow covered aircraft bodies, in combination, a first truss member and a second transverse truss member connected in a joint to the first truss member, said second truss member having the stub end of a longitudinal element extending through an interior opening in the first truss member, said first truss member including strut elements on each side of the opening, and a gusset at one side of the first truss member securing together said strut elements and said stub end, said gusset including spaced coplanar plates at each side of the opening secured to the first truss member and to said strut elements, angle plates secured to said stub end, and a web connecting said angle plates at one edge, said stub end being hollow with plate-like portions secured to the angle gusset plates on each side of said opening, and a hollow longitudinal element of said second transverse truss member secured to each angle plate of the gusset.

10. In a structural assembly, as for hollow covered aircraft bodies, in combination, a first truss member and a second transverse truss member connected in a joint to the first truss member, said second truss member having the stub end of a longitudinal element extending through an interior opening in the first truss member, said first truss member including strut elements on each side of the opening, and a gusset on one side of the first truss member securing together said strut elements and said stub end, said gusset including spaced coplanar plates at each side of the opening secured to the first truss member and to said strut elements, angle plates secured to said stub end, and a web connecting said angle plates at one edge, said stub end being hollow with plate-like portions secured to the angle gusset plates, and a plurality of hollow elements of said second transverse truss member secured to said angle gusset plates.

11. In a structural assembly, as for hollow covered aircraft bodies, in combination, a first truss member and a second transverse truss member connected in a joint to the first truss member, said second truss member having the stub end of a longitudinal element extending through an interior opening in the first truss member, said first truss member including strut elements on each side of the opening, and a gusset at one side of the first truss member securing together said strut elements and said stub end, said gusset including spaced coplanar plates at each side of the opening secured to the first truss member and to said strut elements, angle plates secured to said stub end, and a web connecting said angle plates at one edge, said stub end being hollow with plate-like portions secured to the angle gusset plates, and a plurality of hollow elements of said second transverse truss member secured to said angle gusset plates, one inside the space between the angle plates and one outside.

12. In a structural assembly, as for hollow covered aircraft bodies, in combination, a truss having spaced through-running chords, a flanged box-channel strut secured at its ends through its flanges to said chords, said strut having a through aperture formed in its end adjacent a chord, and a compound gusset having spaced coplanar plates secured to the strut flanges and chords on each side of said aperture, inner parallel angle plates secured to the sides of said strut channel on each side of said aperture, and a web connecting said inner plates at one edge.

13. In a structural assembly, as for hollow covered aircraft bodies, in combination, a truss having spaced through-running chords, a flanged box-channel strut secured at its ends through its flanges to said chords, said strut having a through aperture formed in its end adjacent a chord, and a compound gusset having spaced coplanar plates secured to the strut flanges and chords on each side of said aperture, inner parallel angle plates secured to the sides of said strut channel on each side of said aperture, and a web connecting said inner plates at one edge, and a corresponding joint at the other end of the strut.

14. In a structural assembly, as for hollow covered aircraft bodies, in combination, a truss having spaced through-running chords, a flanged box-channel strut secured at its ends through its flanges to said chords, said strut having a through aperture formed in its end adjacent a chord, and a compound gusset having spaced coplanar plates secured to the strut flanges and chords on each side of said aperture, inner parallel angle plates secured to the sides of said strut channel on each side of said aperture, and a web connecting said inner plates at one edge, and a corresponding joint at the other end of the strut, the coplanar plates of the gusset at one of said joints being extended beyond the strut flanges, and an inclined strut secured to a coplanar gusset plate.

15. In a structural assembly, as for hollow covered aircraft bodies, in combination, a spar including angle-plate chords with coplanar inner plates and transverse outer plates, a plurality of vertical struts secured at their ends to the sides of the inner chord plates beneath said outer plates, said struts being box-channel shaped with side flanges, the side flanges being the parts of the struts which are secured to the chords, said channel having an aperture in the bottom at each end adjacent the chords, a compound angle-plate gusset with spaced coplanar plates secured to the chord flanges and inner chord plates on each side of an aperture, spaced parallel plates secured to the sides of the strut channel on each side of the aperture, and a web connecting said parallel plates at the outer edge, diagonal struts secured to the coplanar plates of some of said gussets, a nose rib having hollow-section longitudinal chords extending through said strut apertures and secured to the inner side plates of the gusset at a distance from the gusset connecting web and across the inner edge of an inner chord plate, a hollow-section diagonal strut of a trailing rib secured within the open end of the stub end of each nose rib chord and having its end abutting a side wall of the nose rib chord, and a channel-section longitudinal chord of the trailing rib secured in straddling relationship over the inner sides and connecting web of the gusset.

16. In a structural assembly, as for hollow covered aircraft bodies, in combination, a spar including angle-plate chords with coplanar inner plates and transverse outer plates, a plurality of vertical struts secured at their ends to the sides of the inner chord plates beneath said outer plates, said struts being box-channel shaped with side flanges, the side flanges being the parts of the struts which are secured to the chords, said channel struts having an aperture in the bottom at each end adjacent the chords, a compound angle-plate gusset with spaced coplanar plates secured to the chord flanges and inner chord plates on each side of an aperture, spaced parallel plates secured to the sides of the channel strut on each side of the aperture, and a web connecting said parallel plates at the outer edge, diagonal struts secured to the coplanar plates of some of said gussets, a nose rib having hollow-section longitudinal chords extending through said strut apertures and secured to the inner side plates of the gusset at a distance from the gusset connecting web and across the inner edge of an inner chord plate, a hollow-section diagonal strut of a trailing rib secured within the open end of the stub end of a nose rib chord and having its end abutting a side wall of the nose rib chord, and a channel-section longitudinal chord of the trailing rib secured in straddling relationship over the inner sides and connecting web of the gusset, said structure also including a flat type gusset with a notch from its outer edge at said aperture straddling one of the nose rib chords on the side of the spar opposite a compound gusset and secured to said strut flanges.

MICHAEL WATTER.